(12) United States Patent
Chen

(10) Patent No.: US 6,903,935 B1
(45) Date of Patent: Jun. 7, 2005

(54) MEMORY CARD WITH A STATIC ELECTRICITY CONDUCTING BOARD

(76) Inventor: Tien-Tzu Chen, 3F, No. 52, Sec. 2, Chunghua Rd., Tucheng City, Taipei Hsien (TW)

( * ) Notice: Subject to any disclaimer, the term of this patent is extended or adjusted under 35 U.S.C. 154(b) by 0 days.

(21) Appl. No.: 10/893,646

(22) Filed: Jul. 16, 2004

(51) Int. Cl.[7] .......................... H05K 1/14; H05K 5/02; H01L 23/06; H01R 12/06
(52) U.S. Cl. .................. 361/737; 361/752; 361/799; 361/753; 235/492; 257/679; 439/65
(58) Field of Search .................. 361/737, 736, 361/752, 800, 816, 818, 753, 760, 728, 730, 361/799; 257/678, 679; 439/60, 65, 66, 68, 439/69, 74, 75, 76.1; 235/492, 487, 441; 174/50, 35 R, 250

(56) References Cited

U.S. PATENT DOCUMENTS

| | | | | |
|---|---|---|---|---|
| 5,600,543 A | * | 2/1997 | Sanemitsu | 361/737 |
| 5,886,874 A | * | 3/1999 | Onoda et al. | 361/737 |
| 6,362,957 B1 | * | 3/2002 | Iwasaki | 361/684 |
| 6,381,143 B1 | * | 4/2002 | Nakamura | 361/737 |
| 6,431,456 B2 | * | 8/2002 | Nishizawa et al. | 235/492 |
| 6,456,504 B1 | * | 9/2002 | LoForte et al. | 361/799 |
| 6,573,567 B1 | * | 6/2003 | Nishizawa et al. | 257/358 |
| 6,784,527 B2 | * | 8/2004 | Fukunaga | 257/679 |

* cited by examiner

Primary Examiner—Kamand Cuneo
Assistant Examiner—Dameon E. Levi
(74) Attorney, Agent, or Firm—Jackson Walker LLP

(57) ABSTRACT

A memory card with a static electricity conducting board has a circuit board, a partitioning board and a conducting board. The circuit board has two contacts. The partitioning board is mounted on the board and has two slots. The conducting board is mounted on the partitioning board and has two conducting tabs located respectively inside the slots and pressing respectively against the contacts on the circuit board. The conducting board attracts static electricity on the circuit board and the chip and keeps the circuit board and the chip from being damaged by the static electricity.

4 Claims, 9 Drawing Sheets

MEMORY CARD WITH A STATIC ELECTRICITY CONDUCTING BOARD

BACKGROUND OF THE INVENTION

1. Field of the Invention

The present invention relates to a memory card, and more particularly to a memory card with a static electricity conducting board for use with a digital camera.

2. Description of Related Art

Digital cameras have become enormously popular in recent years. A primary difference between a digital camera and a conventional optical camera is that the digital camera records photos on a memory card and the conventional optical camera records photos on photographic film.

Memory cards are manufactured in several types such as multimedia (MM) cards, secure digital (SD) cards and reduced size multimedia (RS-MM) cards for use in different types of digital cameras.

A conventional memory card in accordance with the prior art has a circuit board with a chip. The chip is mounted on the circuit board to store digital data. The conventional memory card is mounted in a digital camera and is powered up by the digital camera to store photos taken by the digital camera. Static electricity is generated and retained on the circuit board of the memory card when the memory is powered up. The static electricity may damage the circuit board and the chip and cause the conventional memory card to fail. Therefore, the durability of the conventional memory card is lowered by the static electricity.

To overcome the shortcomings, the present invention provides a memory card with a static electricity conducting board to mitigate or obviate the aforementioned problems.

SUMMARY OF THE INVENTION

The main objective of the invention is to provide a memory card with a static electricity conducting board to discharge any static electricity on a circuit board and the chip of the memory card to keep the circuit board and the chip from being damaged by the static electricity.

The memory card with a static electricity conducting board in accordance with the present invention comprises a circuit board, a partitioning board and a conducting board. The circuit board has two contacts. The partitioning board is mounted on the board and has two slots. The conducting board is mounted on the partitioning board and has two conducting tabs located respectively inside the slots and pressing respectively against the contacts on the circuit board.

Other objectives, advantages and novel features of the invention will become more apparent from the following detailed description when taken in conjunction with the accompanying drawings.

DETAILED DESCRIPTION OF PREFERRED EMBODIMENT

Figure 1:
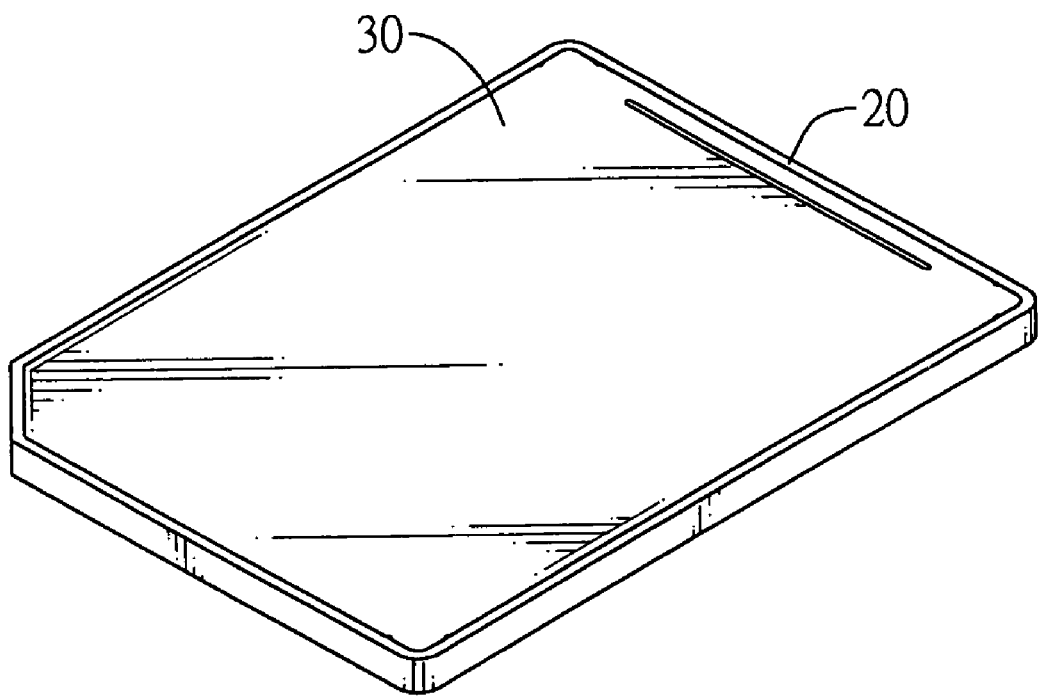
FIG. 1 is a perspective view of a memory card with a static electricity conducting board in accordance with the present invention.

With reference to FIGS. 1 to 4, a memory card with a static electricity conducting board can be mounted in a digital camera (not shown) and comprises a circuit board (10), a partitioning board (20) and a conducting board (30).

The circuit board (10) has a top surface, a bottom surface, a front edge, two side edges, a chip (11), two contacts (12) and multiple pins (13). The chip (11) is mounted in the circuit board (10) and stores digital data. The contacts (12) are mounted on the top surface and are connected electrically to the chip (11). The multiple pins (13) are mounted on the bottom surface at the front edge of the circuit board (10) and are connected electrically to the chip (11). The pins (13) connect the circuit board (10) electrically to the digital camera. The circuit board (10) can be a MM type card, an SD type card or an RS-MM type card.

The partitioning board (20) is made of nonconductive material such as plastic, is mounted on the top surface of the circuit board (10) and has a bottom surface, a top surface, a front edge, a back edge, two side edges and two slots (21). The bottom surface of the partitioning board (20) corresponds to and is attached to the top surface of the circuit board (10). The slots (21) correspond respectively to the contacts (12) and are defined through the partitioning board (20).

The conducting board (30) is made of conductive material such as metal, is mounted on the top surface of the partitioning board (20) and has a top surface, a bottom surface, a front edge, a back edge and two conducting tabs (31). The bottom surface of the conducting board (30) corresponds and is attached to the top surface of the partitioning board (20). The conducting tabs (31) are defined on the bottom surface of the conducting board (30), correspond to and are located respectively inside the slots (21) in the partitioning board (20). Each conducting tab (31) has a bottom surface and a connector (32). The connectors (32) are defined respectively on the bottom surfaces of the conducting tabs (31), extend respectively through the slots (21) and press respectively against the contacts (12) on the circuit board (10).

Figure 2:
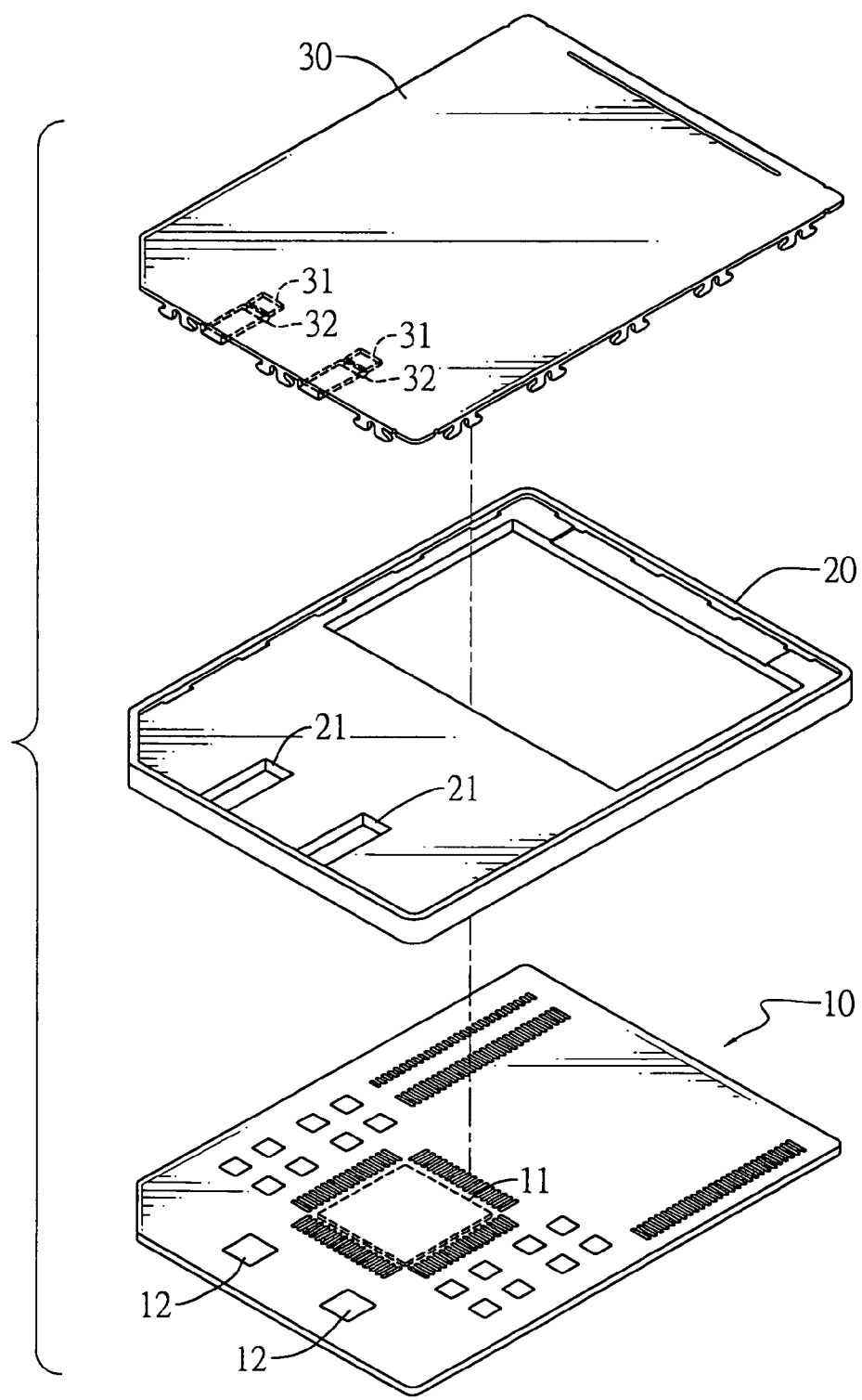
FIG. 2 is an exploded perspective view of the memory card in FIG. 1.
Figure 3:
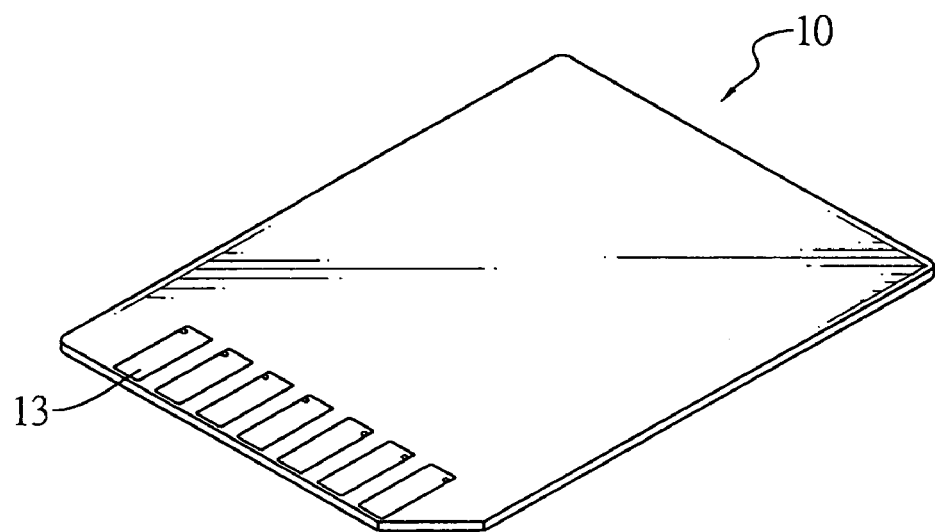
FIG. 3 is a bottom perspective view of the circuit board of the memory card in FIG. 1.
Figure 4:
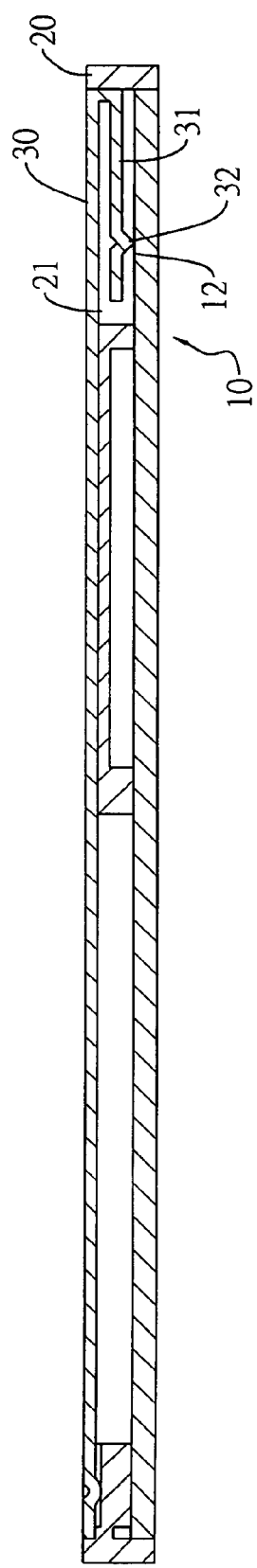
FIG. 4 is a cross sectional side view of the memory card in FIG. 1.
Figure 5:
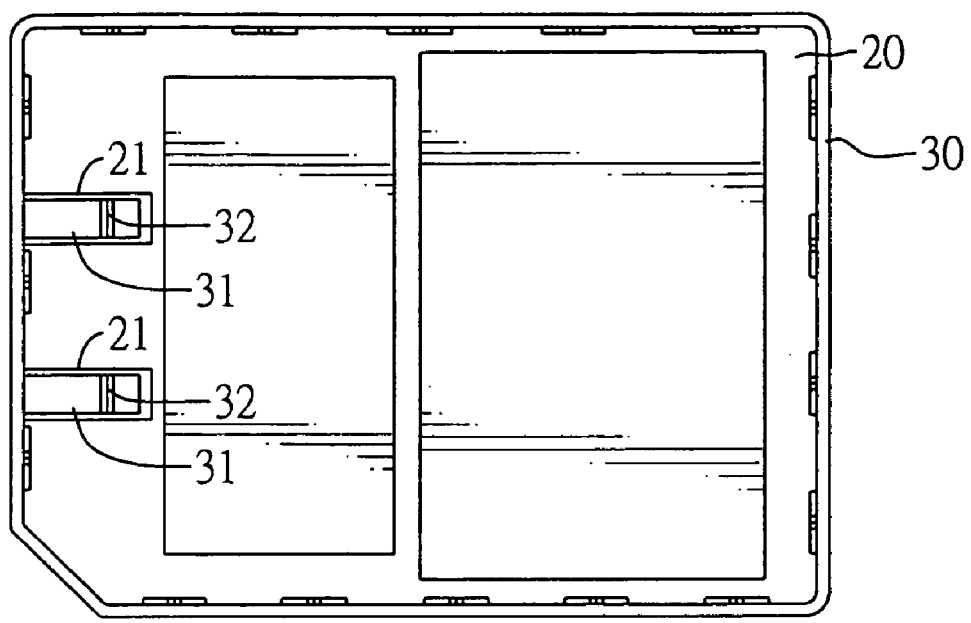
FIG. 5 a bottom view of the conducting board and the partitioning board of the memory card in FIG. 1.

With reference to FIGS. 2 and 5, a first embodiment of the memory card with a static electricity conducting board in accordance with the present invention has the contacts (12), the slots (21) and the conducting tabs (31) at the front edges respectively of the circuit board (10), the partitioning board (20) and the conducting board (30).

Figure 6:
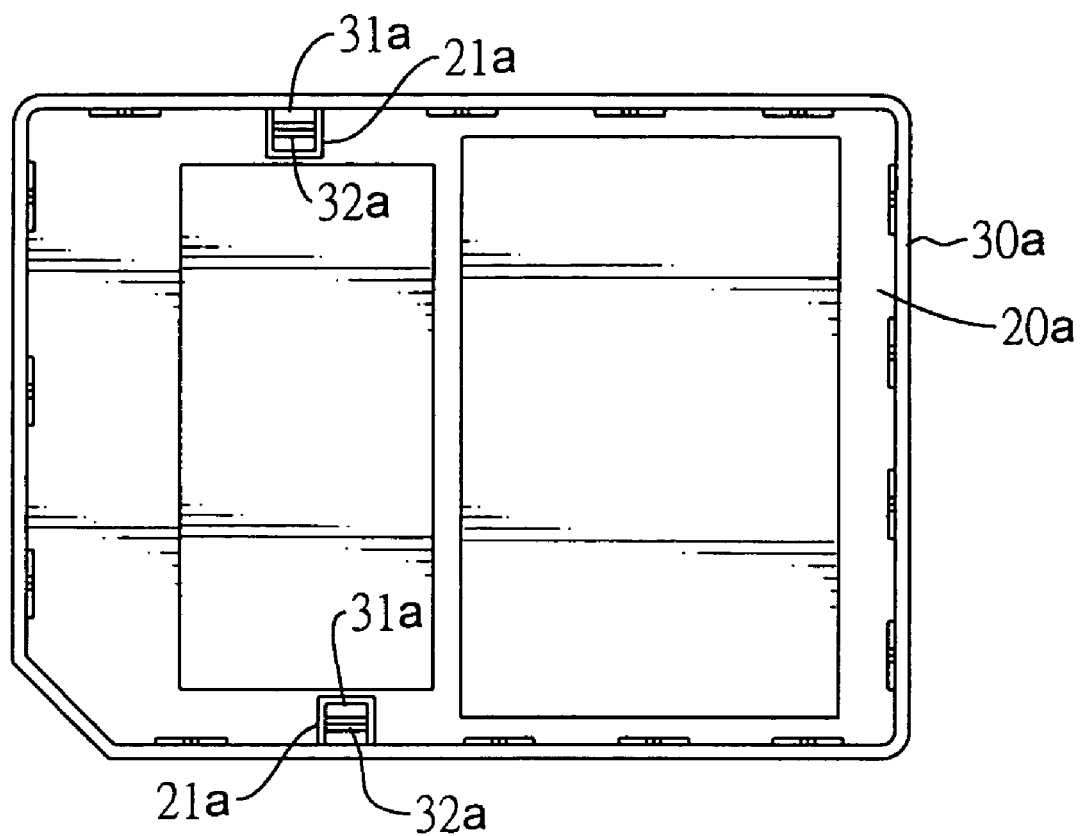
FIG. 6 is a bottom view of the conducting board and the partitioning board of a second embodiment of a memory card with a static electricity conducting board in accordance with the present invention.
Figure 7:
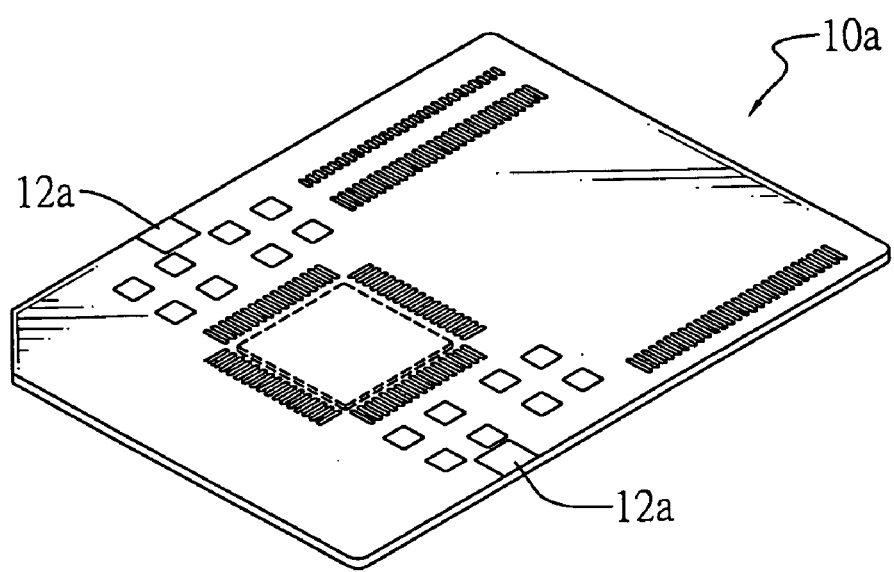
FIG. 7 is a perspective view of a circuit board for use in the memory card in FIG. 6.

With reference to FIGS. 6 and 7, a second embodiment of the memory card with a static electricity conducting board in accordance with the present invention has the contacts (12a), the slots (21a) and the conducting tabs (31a) respectively at the side edges respectively of the circuit board (10*a*), the partitioning board (20) and the conducting board (30*a*).

Figure 8:
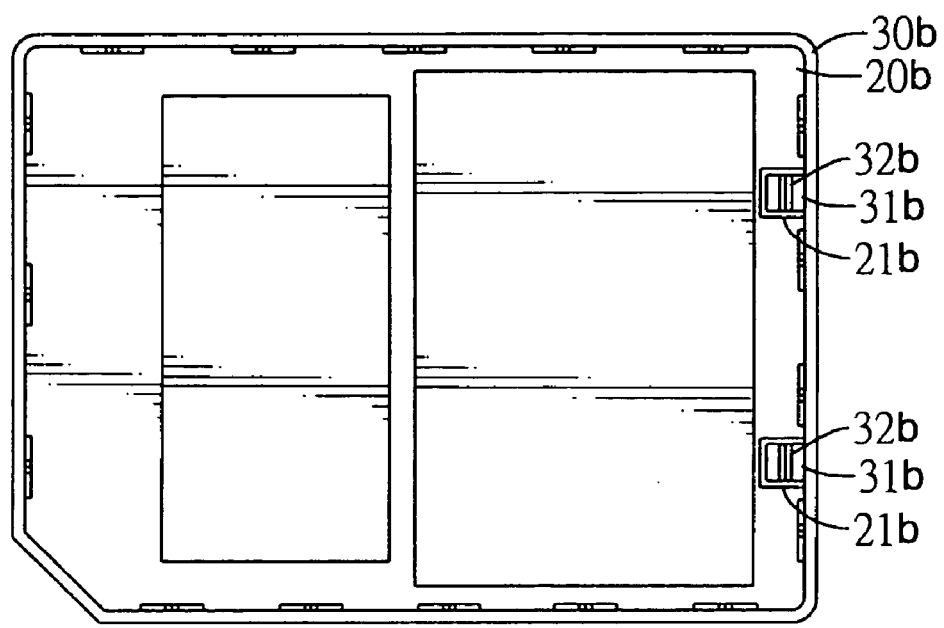
FIG. 8 is a bottom view of the conducting board and the partitioning board of a third embodiment of a memory card with a static electricity conducting board in accordance with the present invention.
Figure 9:
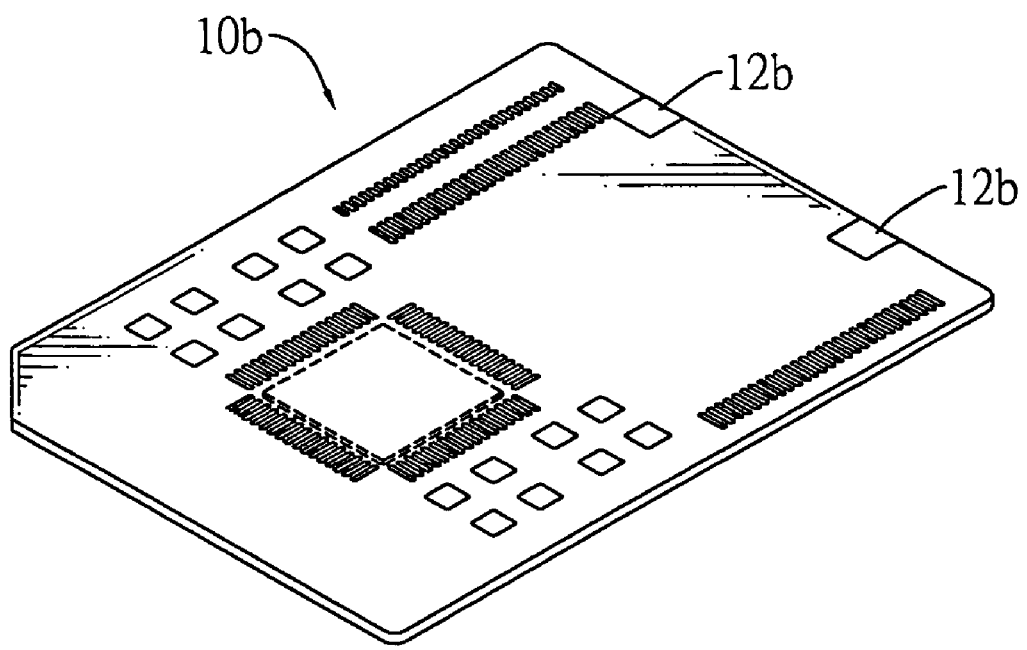
FIG. 9 is a perspective view of a circuit board for use in the memory card in FIG. 8.

With reference to FIGS. 8 and 9, a third embodiment of the memory card with a static electricity conducting board has the contacts (12*b*), the slots (21*b*) and the conducting tabs (31*b*) respectively at the back edge respectively of the circuit board (10*b*), the partitioning board (20*b*) and the conducting board (30*b*).

The memory card with a static electricity conducting board in accordance with the present invention can be mounted in a corresponding digital camera. The conducting tabs (31) contact the contacts (12) and transmit the static electricity on the circuit board (10) and the chip (11) to the conducting board (30). The static electricity on the conducting board (30) dissipates when a person's hand touches the top surface of the conducting board (30).

The conducting board (30) keeps the circuit board (10) and the chip (11) from being damaged by static electricity so the durability of the memory card is improved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A memory card with a static electricity conducting board comprising
    a circuit board having
        a top surface;
        a bottom surface;
        a front edge;
        two side edges;
        a chip mounted in the circuit board for storing digital data;
        two contacts mounted on the top surface and connected electrically to the chip; and
        multiple pins mounted on the bottom surface at the front edge of the circuit board and connected electrically to the chip;
    a partitioning board made of non conductive material, mounted on the top surface of the circuit board and having
        a bottom surface corresponding to and attached to the top surface of the circuit board;
        a top surface;
        a front edge;
        a back edge;
        two side edges; and
        two slots corresponding respectively to the contacts and defined through the partitioning board; and
    a conducting board made of conductive material, mounted on the top surface of the partitioning board and having
        a top surface;
        a bottom surface corresponding to and attached to the top surface of the partitioning board;
        a front edge;
        a back edge; and
        two conducting tabs defined on the bottom surface of the conducting board, corresponding to and located respectively inside the slots in the partitioning board and each having
            a bottom surface; and
            a connector defined on the bottom surface of the conducting tab, extending through one of the slots and pressing against a corresponding one of the contacts on the circuit board.

2. The memory card with a static electricity conducting board as claimed in claim 1, wherein the contacts, the slots in the partitioning board and the conducting tabs are at the front edges respectively of the circuit board, the partitioning board and the conducting board.

3. The memory card with a static electricity conducting board as claimed in claim 1, wherein the contacts, the slots and the conducting tabs are respectively at the side edges respectively of the circuit board, the partitioning board and the conducting board.

4. The memory card with a static electricity conducting board as claimed in claim 1, wherein the contacts, the slots and the conducting tabs are at the back edge respectively of the circuit board, the partitioning board and the conducting board.

* * * * *